N. J. KAVANAUGH.
LOCKING DEVICE FOR AUTOMOBILES.
APPLICATION FILED APR. 19, 1915.
1,185,912.
Patented June 6, 1916.
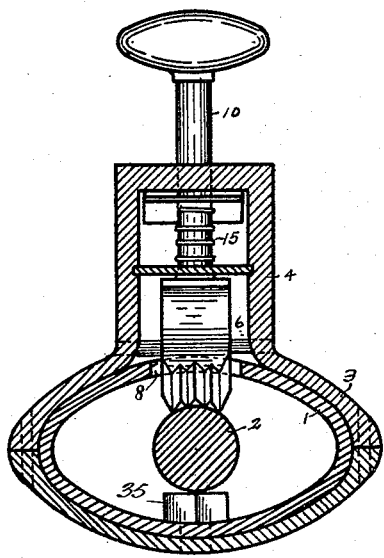
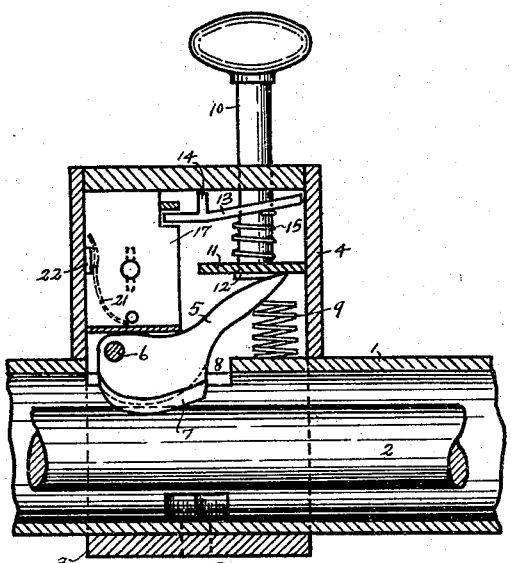
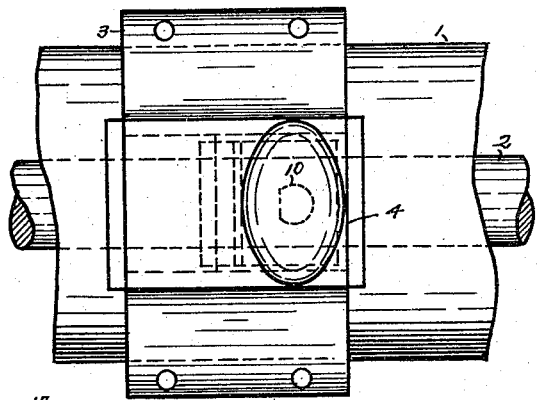
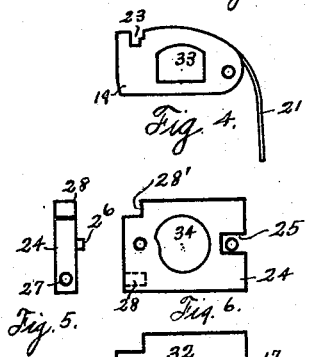
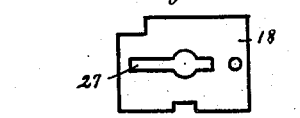
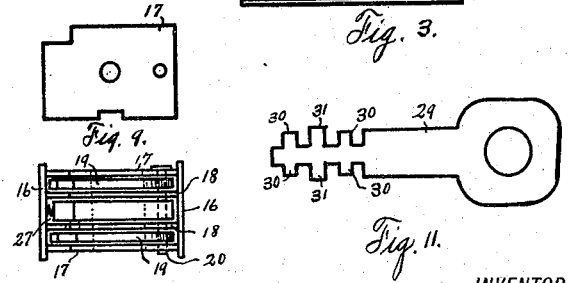
WITNESSES:
INVENTOR
Nelson J. Kavanaugh,
BY
Hardway & Cathey
ATTORNEYS
THE COLUMBIA PLANOGRAPH CO., WASHINGTON, D. C.

UNITED STATES PATENT OFFICE.

NELSON J. KAVANAUGH, OF HOUSTON, TEXAS, ASSIGNOR OF ONE-FIFTH TO CLAUDE L. KAVANAUGH AND ONE-FOURTH TO GEORGE DAGLISH.

LOCKING DEVICE FOR AUTOMOBILES.

1,185,912.     Specification of Letters Patent.     Patented June 6, 1916.

Application filed April 19, 1915. Serial No. 22,246.

*To all whom it may concern:*

Be it known that I, NELSON J. KAVANAUGH, a citizen of the United States, residing at Houston, in the county of Harris and State of Texas, have invented certain new and useful Improvements in Locking Devices for Automobiles, of which the following is a specification.

This invention relates to new and useful improvements in a locking device for automobiles.

The object of the invention is to provide a device of the character described whereby the shaft of the steering post may be locked, rigidly, with said post, so as to make it impossible to steer the automobile and thus protecting it against theft or other unauthorized use.

The steering post of an automobile is fixed rigidly and the steering shaft extends through said post and carries the steering wheel at the upper end and at the lower is connected to the steering mechanism. The device herein described is attached to said steering post and through it the shaft and post may be rigidly locked together, when desired, and when not in use, the locking mechanism may be easily released.

With the above and other objects in view, the invention has particular relation to certain novel features of construction, operation and arrangement of parts, an example of which is given in this specification, and illustrated in the accompanying drawings:

Figure 1, is a transverse sectional view, of the steering post and the locking device carried thereby. Fig. 2, is a longitudinal sectional view thereof. Fig. 3, is a plan view of the locking device, attached to the post, and, Fig. 4 is a side elevation of one of the dogs employed, Figs. 5 and 6 show end and side views respectively of the release plate employed, Fig. 7 shows one form of side plate employed, Fig. 8 shows a side view of one of the partitions, Fig. 9 a side view of another form of side plate, Fig. 10 shows a side view of releasing mechanism and, Fig. 11 shows a plan view of the key whereby said mechanism is released.

Referring now more particularly to the drawings, wherein like numerals of reference designate similar parts in each of the figures, the numeral 1, refers to the steering post of an automobile, which is a tubular member, and through which the steering shaft 2, extends axially. Secured to the post by means of the clamp 3, is the casing 4, which incloses the mechanism of the locking device.

Within the casing 4, is the lever 5, one end of which is pivoted upon the transverse shaft 6, arranged near the end of the casing, and this lever carries a cam-shaped face 7, which projects through an alined slot 8, in the steering post, and which has sharp longitudinal corrugations or teeth, as shown in Fig. 1. The free end of this lever rests upon a resilient seat 9, which is interposed between said free end and the steering post 1, and the inner end of the manual push-rod 10, seats against the free end of said lever, and opposes said seat. When said push-rod is forced inwardly, the resilient seat 9, is compressed and the corrugations of the face 7, engage with the shaft 2, and lock it against turning relative to the steering post, and when said push rod is released, the resilient seat 9, will operate to release said shaft. This push-rod slides through alined bearings in the outer wall of the casing 4, and in the partition 11, within the casing, and the rod has one side flattened, as shown in Fig. 3, and said bearings conform in shape thereto, so as to prevent the turning of the rod, and the inner end of said rod is enlarged forming the head 12, to prevent its disengagement. A plate 13, is provided within the casing, which is fulcrumed on the bridge 14. The rod 10, passes through an alined orifice in one end of this plate and surrounding the push-rod 10, and interposed between the plate and partition 11, is the coil spring 15. The other end of said plate is controlled by a locking mechanism presently to be described. This mechanism is shown in detail in Figs. 4 to 10, inclusive and embodies the shell formed of the ends 16, 16, the side plates 17, 17, secured thereto, and the partitions 18, 18, which are secured to said end plates and are parallel with the side plates and spaced a uniform distance from said side plate and from each other. Between the partitions 18, 18, and the corresponding side plates, on each side, are the dogs 19, 19, whose inner ends are pivoted on the transverse shaft 20, and integral with said ends of said dog are the flat springs 21, 21, whose free ends engage behind the cross bar 22, which is secured to the plates 17, 17, and these springs normally hold said dogs in a forward position. Each dog has a notch, as 23, near its outer end in the forward edge thereof, which normally engages with the adjacent end of the plate 13. Between the partitions 18, 18, is the release plate 24, whose lower end has a lengthwise slot 25, forming a bearing through which the shaft 20, extends, and whose outer end has the laterally projecting stud 26, which moves in the slot 27, of the adjacent partition 18, as a bearing. Interposed between the outer end of this plate and the adjacent end 16, is the coil spring 27, which seats in the socket 28, of said plate and normally holds said plate depressed. The release plate 24, has a shoulder 28', which normally engages under the adjacent end of the plate 13 and operates, at the proper time, to elevate said end of said plate.

When the push-rod 10, is forced inwardly, the cam-shaped face 7, engages against the shaft 2, as hereinbefore explained, said rod sliding through its bearing in the plate 13. A block 35 is secured in the steering post on the opposite side of the shaft from said cam, which is provided to prevent the bending of shafts to when the cam is forced against it. When in this position, the push-rod 10, will be locked against outward movement automatically, by reason of the fact that the push-rod passes angularly through said plate and outward pressure exerted against said rod tends to lock it, with the plate, more firmly.

When it is desired to unlock the device from the shaft 2, a key 29, having the tangs 30, 30, and 31, on each side, is employed. This key is inserted in the ordinary manner, passing through the key-hole 32, of one of the end plates 17, and through the central apertures, as 33, of the dogs 19, 19, and 34, of the release plate 24. The apertures 33, each have a straight and an arcuate side, and one side of the aperture 34, is cam-shaped. As the key is turned, the tangs 30, 30, press against the opposing straight sides, of the apertures 33, and force the dogs 19, 19, back, releasing the end of the plate 13, and as the key is turned further, the tang 31, operates against the cam-shaped side of the aperture 34, and elevates the release plate 24. The shoulder 28, engages under the corresponding end of the plate 13, and elevates said end, and the plate 13, operating on the bridge 14, as a fulcrum is brought at right angles to the push-rod 10, so that the same slides freely through its bearing in said plate, and the resilient seat 9, operates to lift the lever 5, and release the shaft 2. When the tang 31, passes said cam, the spring 27 operates to depress the release plate 24, and the corresponding end of the plate 13, is lowered by the pressure of the spring 15, against the opposite end thereof and, at the same time, the free ends of the dogs 19, are forced outwardly by the springs 21, the notches 23, engaging with the adjacent end of the plate 13 and holding said plate in fixed position until again released by the key, as above explained.

When it is desired to lock the automobile, the push-rod is forced inwardly, engaging the cam-face 7, with the shaft 2, and the locking plate 13, will hold said push-rod against outward movement, and will hold the shaft 2, locked against turning, until the same is released by the key 29. The teeth of the cam-face 7, have sharp edges and are formed of high grade steel and sufficient force applied to the push rod will cause them to engage with the shaft 2, so as to make it impracticable to turn the same.

I have shown only one form of this device, but it is obvious that the mechanical structure thereof may be varied without departing from the principle of the invention, and I hereby reserve the right to make such structural changes as may be found desirable so long as I keep within the scope of the appended claims.

What I claim is:

1. A device of the character described including a tubular member, a shaft extending axially therethrough and means for securing said shaft against rotation relative to said tubular member, said means including a pivoted cam and a push rod for forcing the same against the shaft.

2. A device of the character described including a tubular member, a shaft extending axially therethrough and normally rotatable independent of said member, a cam for securing the shaft against rotation, a push rod for forcing the cam against the shaft and means for releasing said cam from said shaft.

3. A device of the character described including a tubular steering post, a shaft extending axially therethrough and rotatable independent of said post, a toothed cam-shaped locking member pivoted with respect to the steering post, and means for forcing the teeth of said member into engagement with the shaft whereby the shaft is secured against rotation.

4. A device of the character described including a steering post, a shaft rotatable independent of said post, a cam pivoted with respect to the post and adapted to be forced into engagement with the shaft, a push-rod in engagement with said cam and movable freely against the same whereby it may be forced against said shaft and means locking said rod against movement in the opposite direction.

5. A device of the character described including a fixed post, a shaft rotatable independent of the post, a locking mechanism, secured to the post and including a cam pivoted at one end, a push-rod operating against the other end of the cam through which the cam may be forced against said shaft to lock the same against rotation.

6. A device of the character described including a fixed post, a shaft rotatable independent of said post, a locking mechanism fixed to the post and including a cam, a push-rod, through which the cam may be forced against the shaft and a means for locking the push-rod against outward movement.

7. A device of the character described including a fixed post, a shaft rotatable independent of said post, a locking mechanism fixed to the post and including a cam, a push-rod operable against the cam and through which the cam may be forced against the shaft, a means for locking the push-rod against outward movement, and means for releasing said locking means.

8. A device of the character described including a post, a shaft rotatable independent of said post, a locking mechanism fixed to the post and including a cam having engaging teeth pivoted at one end, a push-rod arranged to operate against the other end of the cam, whereby the teeth of the cam may be forced into engagement with the shaft, a means for locking the push rod against outward movement and means for releasing said locking means.

In testimony whereof I have signed my name to this specification in the presence of two subscribing witnesses.

NELSON J. KAVANAUGH.

Witnesses:
 C. L. KAVANAUGH,
 GEORGE DAGLISH.

Copies of this patent may be obtained for five cents each, by addressing the "Commissioner of Patents Washington, D. C."